3,000,234
TRANSMISSION MECHANISM
Everett Ruston Burtnett, China Lake, Calif., assignor to Borg-Warner Corporation, a corporation of Illinois
Filed Aug. 23, 1957, Ser. No. 679,866
8 Claims. (Cl. 74—688)

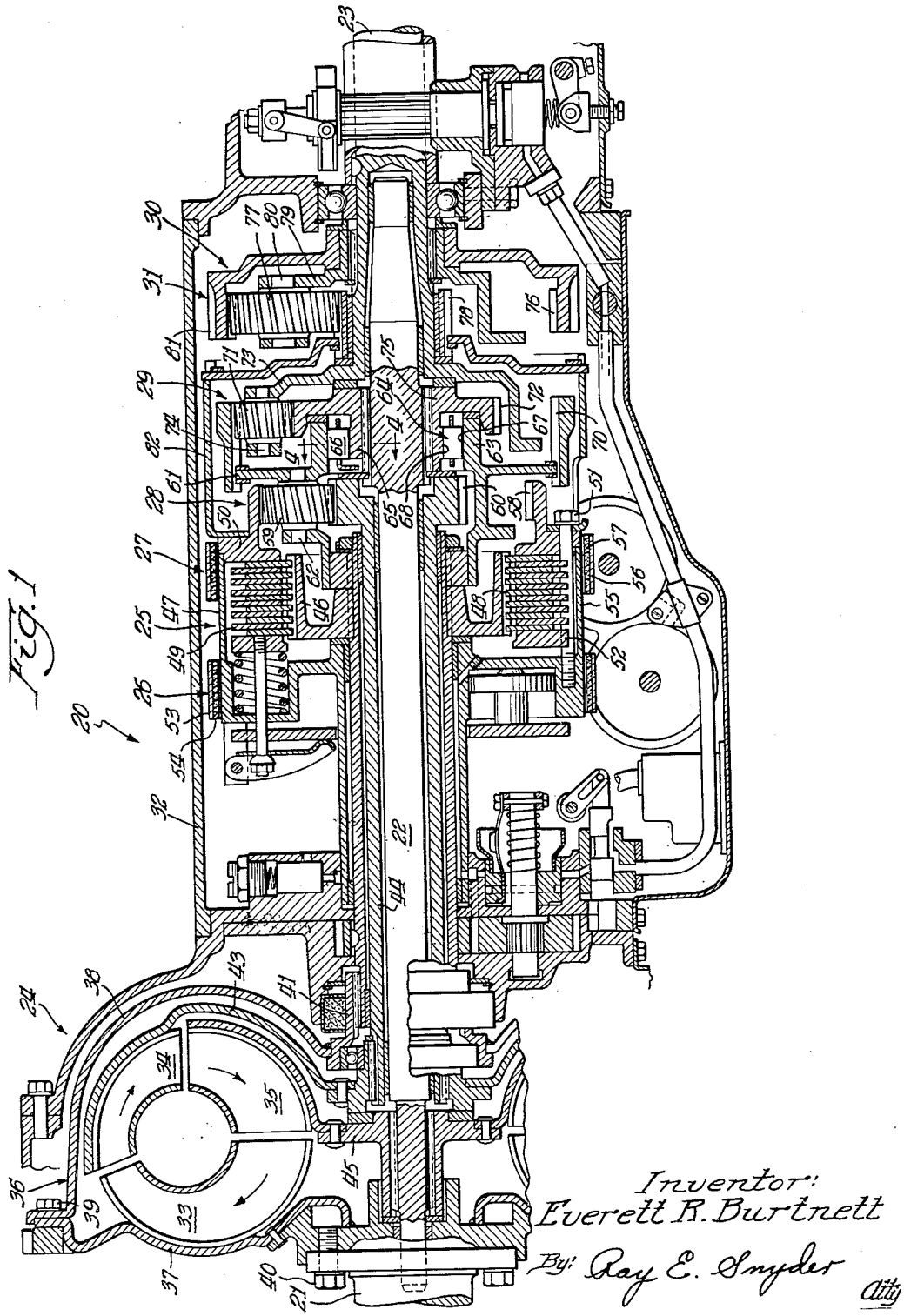

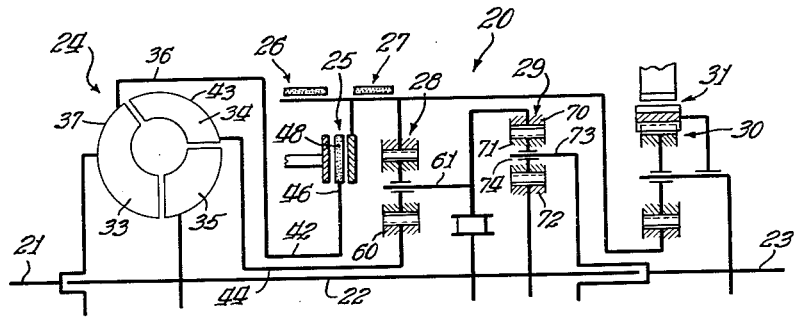
Fig. 2 NEUTRAL
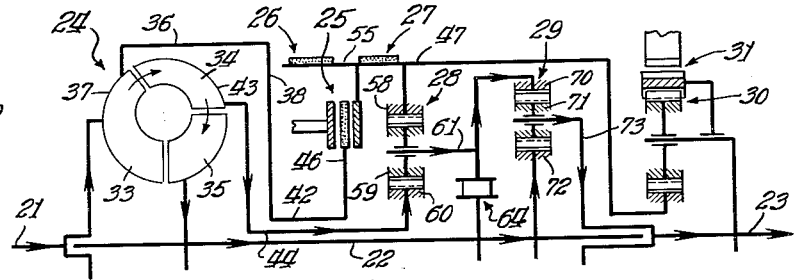
Fig. 3 LOW-SECOND
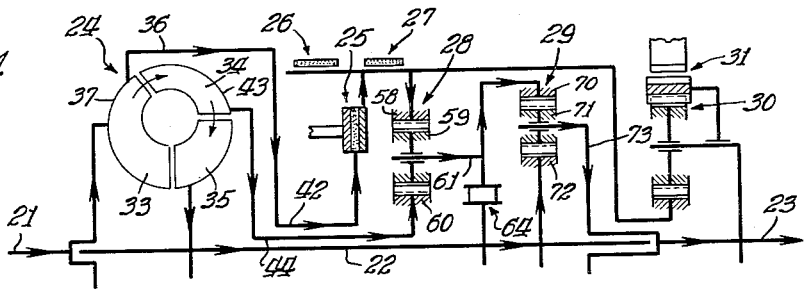
Fig. 4 HIGH
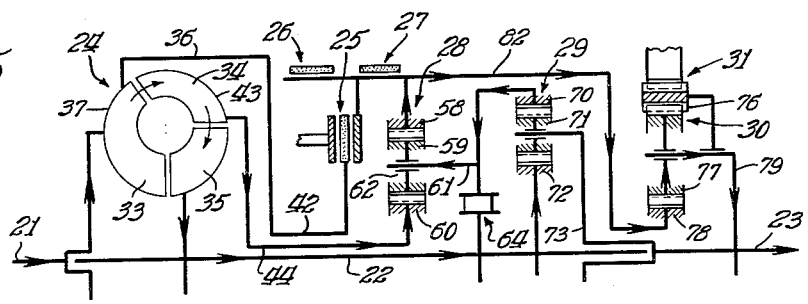
Fig. 5 REVERSE United States Patent Office 3,000,234
Patented Sept. 19, 1961

My invention relates to transmission mechanisms for automotive vehicles and more particularly to such transmissions of the automatic type utilizing hydrodynamic coupling means.

It is an object of the present invention to provide an improved transmission utilizing a hydrodynamic coupling device and having a low speed forward drive, a second speed forward drive, a high speed forward drive, and a reverse drive; and including planetary gearing and clutching and braking elements for completing these drives.

It is another object to provide an improved hydrodynamic coupling device in combination with planetary gearing and a one-way clutch for establishing infinitely variable driving gear ratios between low speed forward drive and second speed forward drive through the transmission.

It is still another object to provide an improved hydrodynamic coupling device having two driven elements or turbines in combination with planetary gearing and clutching means for establishing infinitely variable driving gear ratios between low speed forward drive and second speed forward drive.

It is an additional object to provide an improved hydrodynamic coupling device having two driven elements or turbines in combination with planetary gearing and clutching means for completing a three path power flow through the transmission.

It is still another object to provide a reverse drive power train through the transmission utilizing a plurality of planetary gear sets in combination with a one-way clutch wherein one of the planetary gear sets functions as a rotating reaction element for a second gear set and the forward driving of one element of said second gear set is effective to drive reversing torque in another element of said second gear set, said reverse driving torque being transmitted to the output shaft of the transmission.

The invention consists of the novel constructions, arrangements, and devices to be hereinafter described and claimed for carrying out the above stated objects and such other objects as will be apparent from the following description of a preferred form of the invention illustrated with reference to the accompanying drawings wherein:

FIG. 1 is a longitudinal sectional view of a transmission embodying the principles of the invention and which includes a manually operable selector valve.

FIGS. 2, 3, 4 and 5 are line diagrams of the transmission illustrated in its neutral, low speed forward drive, high speed forward drive, and reverse drive conditions, respectively.

Like characters of reference designate like parts in the several views.

Referring to the drawings, a transmission mechanism 20 embodying the principles of the invention is shown as it is used in an automotive vehicle. The transmission mechanism 20 includes a drive shaft 21, an intermediate shaft 22, and a driven shaft 23, all disposed coaxially with the ends of the intermediate shaft 22 piloted into enlarged end portions of the drive shaft 21 and the driven shaft 23. The drive shaft 21 is adapted to be connected to the crank shaft of the vehicle engine, and the driven shaft 23 is adapted to be connected to the driving road wheels of the vehicle through any suitable means (not shown).

The transmission mechanism 20, as a whole, comprises a hydrodynamic unit 24, a multiple plate clutch 25, brakes 26 and 27, a front planetary gear unit 28, an intermediate planetary gear unit 29, a rear planetary gear unit 30, and a reverse drive positive brake 31, all enclosed within a casing 32.

The hydrodynamic unit 24 comprises a bladed driving element or impeller 33, a bladed primary driven element or turbine 34, and a bladed secondary driven element or turbine 35, all enclosed within a fluid housing 36. The housing 36 is filled with fluid under pressure and has sections 37 and 38 which are fastened together by machine screws 39. The section 37 is integral with the impeller 33 and is fastened to the drive shaft 21 by machine screws 40. The section 38 is welded to a hub 41 which is splined to a sleeve shaft 42 journalled within the transmission casing 32. The primary turbine 34 is integral with a section 43 which is splined to a sleeve shaft 44 journalled inside of the sleeve shaft 42. The secondary turbine 35 is fastened to a hub 45 which is splined to the intermediate shaft 22. The intermediate shaft 22 is journalled inside of the concentric sleeve shafts 44 and 42.

The multiple plate clutch 25 comprises an inner drum 46, an outer drum 47, plates 48 splined to the inner drum 46, plates 49 splined within the outer drum 47 and interleaved with the plates 48, a fixed end plate 50 fastened to the outer drum 47 by machine screws 51, and a movable end plate 52 for engaging the plates 47 and 48.

The brake 26 comprises a band 53 and a friction facing 54 adapted to engage an external surface 55 formed on the outer drum 47 of the clutch 25. The brake 27 comprises a band 56 and a friction facing 57 also adapted to engage the external surface 55.

The front planetary gear unit 28 comprises a ring gear 58, a plurality of planet gears 59, a sun gear 60, and a planet gear carrier 61. The planet gears 59 are in mesh with the ring gear 58 and with the sun gear 60 and are free to rotate about studs 62 mounted in the planet carrier 61. The ring gear 58 is integral with the end plate 50 of the clutch 25. The sun gear 60 is formed on the sleeve shaft 44 and the planet carrier 61 is journalled on the sleeve shaft 42.

An extended hub portion 63 of the planet carrier 61 forms an external part of a one-way clutch 64. The one-way clutch 64 comprises the external hub 63, and internal hub 65, and a plurality of rollers 66 interposed between an internal cylindrical surface 67 formed in the hub 63, and an external surface 68 formed on the hub 65. The hub 65 is splined to the intermediate shaft 22 and has a cam 69 for each of the rollers 66 for gripping the rollers 66 between the surfaces 67 and 68.

The intermediate planetary gear unit 29 comprises a ring gear 70, a plurality of planet gears 71, a sun gear 72, and a planet gear carrier 73. The planet gears 71 are in mesh with the ring gear 70 and with the sun gear 72 and are free to rotate about studs 74 mounted in the planet carrier 73. The ring gear 70 is splined to the planet carrier 61 of the front planetary gear unit 28. The sun gear 72 is formed on a hub 75 which is splined to the intermediate shaft 22. The planet carrier 73 is integral with an enlarged portion of the driven shaft 23.

The rear planetary gear unit 30 comprises a ring gear 76, a plurality of planet gears 77, a sun gear 78, and a planet gear carrier 79. The planet gears 77 are in mesh with the ring gear 76 and with the sun gear 78 and are free to rotate about studs 80 mounted in the planet carrier 79. The planet carrier 79 is splined to the driven shaft 23. The ring gear 76 has external teeth 81 forming a part of the reverse drive positive brake 31, and the ring gear 76 is journalled about an extension of the planet carrier 79 which is splined to the driven shaft 23. The sun gear 78 is journalled about the driven shaft 23 and is splined to a drum 82 which is fastened to the outer drum 47 of the clutch 25 by the machine screws 51.

The reverse drive positive brake 31 comprises a pawl 83 having teeth 84 adapted to engage the external teeth 81 formed on the ring gear 76.

The transmission mechanism 20 may have a neutral condition and four driving conditions, namely, low speed forward drive, second speed forward drive, high speed forward drive, and reverse drive.

The operation of the transmission mechanism 20 in its various conditions may best be understood by reference to FIGS. 2 through 5 inclusive.

The transmission mechanism 20 is in its neutral condition, as shown in FIG. 2, when the clutch 25 is disengaged, the brakes 26 and 27 are disengaged, and the reverse drive positive brake 31 is disengaged. With the vehicle engine idling in this condition, torque delivered by the engine is transmitted through the drive shaft 21, the fluid housing 36, and the sleeve shaft 42 to the inner drum 46 of the clutch 25. The clutch 25 being disengaged, the inner drum 46 and the plates 48 rotate freely. Torque is also transmitted through the drive shaft 21 and the section 37 of the fluid housing 36 to the impeller 33 of the hydrodynamic unit 24. The rotation of the impeller 33 sets the fluid within the housing 36 in motion in a toroidal fashion, that is, fluid flows through the blades of the impeller 33 into the primary turbine 34, thence through the secondary turbine 35 and back into the impeller 33. The moving fluid imparts an impulse to the blades of the primary turbine 34 causing it to rotate in the forward direction. Very little impulse is imparted to the secondary turbine 35 because most of the energy transmitted by the impeller 33 is absorbed by the primary turbine 34 until its speed of rotation approaches that of the impeller 33. As the turbine 34 is driven forwardly, this driving torque is transmitted through the shell section 43 and the sleeve shaft 44 to the sun gear 60 of the front planetary gear unit 28. The brakes 26 and 27 being disengaged, there is no reaction element for the front planetary gear unit 28, and the elements of the gear unit 28 therefore rotate freely.

Any torque delivered by the impeller 33 to the secondary turbine 35 tends to drive the intermediate shaft 22 and the sun gear 72 of the intermediate planetary gear unit 29 in the forward direction. With the driven shaft 23 and the planet carrier 73 at rest, any forward rotation of the sun gear 72 causes the planet gears 71 to rotate about the studs 74 and drive the ring gear 70 in the reverse direction. The ring gear 70, being rigidly connected with the planet carrier 61 of the front gear unit 28, rotates freely with the planet carrier 61. All of the torque delivered by the engine is thus dissipated within the transmission 20.

Low speed forward drive is obtained, as shown in FIG. 3, when the clutch 25 is disengaged, the brakes 26 and 27 are engaged with the outer surface 55 on the drum 47, and the reverse drive positive brake 31 is disengaged. In this condition, torque delivered by the engine is transmitted through the drive shaft 21 and the section 37 of the fluid housing 36 to the impeller 33 of the hydrodynamic unit 24. The section 38 of the housing 36, the sleeve shaft 42, and the inner drum 46 of the disengaged clutch 25 rotate freely. The torque delivered by the impeller 33 is transmitted through the turbine 34, the section 43, and the sleeve shaft 44 to the sun gear 60 of the front planetary gear unit 28. The engaged brakes 26 and 27 lock the ring gear 58 against rotation and take reaction for the gear unit 28. The forward rotation of the sun gear 60 drives the planet gears 59 and the planet carrier 61 forwardly at reduced speed and increased torque, and this torque is transmitted through the planet carrier 61 and the ring gear 70 of the intermediate planetary gear unit 29 to the planet gears 71. Initially, as the speed of the vehicle engine is increased, and with the driven shaft 23 and the vehicle stationary, the primary turbine 34 rotates at a greater speed than the secondary turbine 35. The toroidally flowing fluid within the hydrodynamic unit 24 imparts an impulse to the blades of the primary turbine 34 causing it to rotate in the forward direction. Very little impulse is imparted to the secondary turbine 35 because most of the momentum of the moving fluid is absorbed by the primary turbine 34. The relatively small sun gear 60 of the front gear unit 28 is driven by the primary turbine 34 and drives the planet carrier 61 forwardly at reduced speed. Since, initially, as the vehicle begins movement, little impulse is imparted to the secondary turbine 35, the secondary turbine 35 does not tend to drive the relatively large sun gear 72 through the shaft 22; however, the forward rotation of the carrier 61 causes the one-way unit 64 to lock up and carry with it the shaft 22 and the secondary turbine 35. The engaged one-way clutch 64 locks together the ring gear 70 and the sun gear 72, so that all of the elements of the gear unit 29 rotate forwardly as a unit, carrying the planet gear carrier 73 and the driven shaft 23 forwardly at low speed. Under these conditions, there is a fixed speed ratio between the shaft 44, which may be considered the output element for the hydrodynamic device 24, and the driven shaft 23, and this may be considered as a so-called low speed drive for the transmission.

A gradual transition from low speed drive to a second speed drive is obtained when the one-way clutch 64 unlocks. As the speed of the turbine 34 and of the driven shaft 23 increase, the secondary turbine 35 receives more and more impulse from the moving fluid, and eventually the power received from the secondary turbine 35 and its driven shaft 22 is sufficient to cause the one-way clutch 64 to over run and substantial power is then applied to the relatively large sun gear 72. At this time, the sun gear 72 drives the planet gears 71 and the planet gear carrier 73 forwardly at a relatively greater speed than the ring gear 70. The ring gear 70 continues to rotate forwardly with the planet carrier 61 of the front gear unit 28, and in this condition functions as a rotating reaction element for the gear unit 29, so that the sun gear 72 drives the planet gears 71 and the planet gear carrier 73 at increased relative speed with respect to the ring gear 70. It will be understood that as the secondary turbine 35 receives more and more impulse from the impeller 33, the speed of the secondary turbine 35 increases gradually from the point at which the one-way unit 64 begins to over run, and the speed ratio between the shafts 21 and 23 gradually increases. Eventually, the turbines 34 and 35 will both rotate at substantially the speed of the impeller 33, with a negligible amount of slip between the turbines 34 and 35 and the impeller 33, and under these conditions, a certain fixed reduced speed ratio drive is reached between the shafts 21 and 23. This fixed reduced speed ratio drive may be considered as an intermediate or second speed forward drive. The hydrodynamic unit 24 in conjunction with the gear units 28 and 29 and the one-way clutch 64 are thus effective for providing an infinite number or progressively increasing gear ratios for forward driving of the vehicle.

High speed forward drive is obtained, as shown in FIG. 4, when the clutch 25 is engaged, the brakes 26 and 27 are disengaged, and the reverse drive positive brake 31 is disengaged. In this condition, torque delivered by the vehicle engine is transmitted through the drive shaft 21 to the section 37 of the fluid housing 36. The torque is split at the section 37 into two paths, one mechanical and one fluid path. Torque is transmitted by way of the mechanical path through the fluid housing 36, the sleeve shaft 42, the engaged clutch 25, and the ring gear 58 of the front planetary gear unit 28 to the planet gears 59. The torque transmitted by the fluid path is split again within the hydrodynamic unit 24 and is transmitted from the impeller 33 through a first fluid path including the primary turbine 34, the section 43, the sleeve shaft 44, and the sun gear 60 of the gear unit 28 to the planet gears 59. The torque transmitted through this first fluid path recombines in the planet gears 59 with the torque transmitted through the first described mechanical path. The combined torque is then transmitted through the planet carrier 61 and the ring gear 70 of the intermediate planetary gear unit 29 to the planet gears 71. Torque delivered by the impeller 33 is also transmitted through a second fluid path including the secondary turbine 35, the intermediate shaft 22, and the sun gear 72 of the intermediate gear unit 29 to the planet gears 71. Torque delivered through this last described path recombines in the planet gears 71 with the torque delivered through the planet carrier 61 and the ring gear 70. This combined torque is delivered through the planet carrier 73 to the driven shaft 23. The transmission 20 is thus essentially in direct drive through the gear units 28 and 29 all of the elements of which rotate as a unit, except for slippage that occurs within the hydrodynamic unit 24.

Reverse drive is obtained, as shown in FIG. 5, when the clutch 25 is disengaged, the brakes 26 and 27 are disengaged, and the reverse drive positive brake 31 is engaged. In this condition, torque delivered by the vehicle engine is transmitted through the drive shaft 21 and the section 37 of the fluid housing 36 to the impeller 33 of the hydrodynamic unit 24. Torque delivered by the impeller 33 is transmitted by the moving fluid to the primary turbine 34 and through the sleeve shaft 44 to the sun gear 60 of the planetary gear set 28. The sun gear 60 tends to drive the planet gears 59 and the planet carrier 61 forwardly and causes the one-way clutch 64 to engage. The engaged one-way clutch 64 locks together the sun gear 72 and the ring gear 70 of the gear unit 29, and since the driven shaft 23 and the planet carrier 73 formed thereon are initially stationary, the entire gear set 29 serves as a reaction element for the front planetary gear unit 28 through the planet carrier 61. The forward rotation of the sun gear 60 causes the planet gears 59 to rotate about the studs 62 and drive the ring gear 58 reversely. The reverse rotation of the ring gear 58 is transmitted through the drum 82 to the sun gear 78 of the rear planetary gear unit 30. The reverse drive positive brake holds the ring gear 76 stationary and it serves as a reaction element for the gear unit 30. The reverse driving torque of the sun gear 78 drives the planet gears 77, the planet carrier 79, and the driven shaft 23 in the reverse direction. As the driven shaft 23 rotates reversely, the planet carrier 73 and the locked up gear unit 29 rotate reversely with it while continuing to function as a reaction element for the front gear unit 28. The reverse rotation of the planet carrier 61 with the gear unit 29 causes the ring gear 58 to rotate reversely at increased speed. This increased speed of rotation of the ring gear 58 is transmitted through the sun gear 78 and the planet carrier 79 to the driven shaft 23, thereby increasing reverse driving speed through the transmission.

A parking gear for the transmission 20 is provided when the reverse drive positive brake 31 is engaged and the clutch 25 is adapted to be engaged when the vehicle engine is at rest. With the reverse drive positive brake 31 engaged and the clutch 25 engaged, a direct connection is made between the drive shaft 21 and the driven shaft 23 through the fluid housing 36, the sleeve shaft 42, the engaged clutch 25, the drum 82, and the planetary gear unit 30, thereby preventing rotation of the driven shaft 23 in either direction against the compression of the vehicle engine, and thereby preventing motion of the car out of a parked condition.

I wish it to be understood that my invention is not to be limited to the specific constructions and arrangements shown and described, except only insofar as the claims may be so limited, as it will be understood to those skilled in the art that changes may be made without departing from the principles of the invention.

I claim:
1. In a transmission, the combination of a drive shaft; a driven shaft; a hydrodynamic coupling device driven from said drive shaft and having primary and secondary driven elements or runners; first and second planetary gear sets, said primary runner being connected with an element of said first gear set and said secondary runner being connected with an element of said second gear set, another element of said second gear set being connected to drive said driven shaft; and a brake for an element of said first gear set, a planetary gear carrier in said first planetary gear set being connected to a third element of said second gear set and interconnected with a one-way clutch to a sun gear in said second gear set for locking up the first planetary gear carrier and the second sun gear so that said brake is effective to establish a drive from said primary runner through both of said gear sets to said driven shaft, said secondary runner disengaging said one-way clutch for providing an increasing drive of said second planetary gear set as the speed of said driven shaft increases so that the ratio of drive between said driving and driven shafts increases.

2. In a transmission, the combination of a drive shaft; a driven shaft; a hydrodynamic coupling device driven from said drive shaft and having primary and secondary turbines; first and second planetary gear sets, said primary gear turbine being connected with an element of said first gear set and said secondary turbine being connected with an element of said second gear set, another element of said second gear set being connected to said driven shaft; a brake for an element of said first gear set; and a one-way clutch for interconnecting a planetary gear carrier of said first gear set and a sun gear of said second gear set, said carrier being connected to a ring gear of said second gear set, said brake being effective to establish a drive from said primary turbine through both of said gear sets to said driven shaft, and said secondary turbine disengaging said one-way clutch for providing an increasing drive of said second planetary gear set as the speed of said driven shaft increases so that the driving ratio between said drive shaft and said driven shaft increases.

3. In a transmission, the combination of a drive shaft; a driven shaft; a hydrodynamic coupling device having a driving element or impeller driven from said drive shaft and primary and secondary driven elements or turbines; first and second planetary gear sets each having a ring gear, a sun gear, a plurality of planet gears in mesh with said ring and sun gears, and a planet gear carrier, said primary turbine being connected with said first sun gear and said secondary turbine being connected with said second sun gear, said second planet gear carrier being connected to drive said driven shaft, a brake for said first ring gear and said first planet gear carrier being interconnected with said second ring gear so that said brake is effective to establish a driving connection from said primary turbine through both of said gear sets to said driven shaft, a one-way clutch interconnecting said interconnected carrier and ring gear with said second sun gear, said secondary turbine providing an increasing drive of said second sun gear for disengaging said one-way clutch so that as the speed of said driven shaft increases the driving gear ratio between said drive shaft and said driven shaft increases.

4. In a transmission, the combination of a drive shaft; a driven shaft; a hydrodynamic coupling device having a driving element or impeller driven from said drive shaft and primary and secondary driven elements or turbines; a first planetary gear set having a ring gear, a sun gear, a plurality of planet gears in mesh with said ring and sun gears, and a planet gear carrier; a second planetary gear set having a ring gear, a sun gear, a plurality of planet gears in mesh with said ring and sun gears, and a planet gear carrier connected to drive said driven shaft, said primary turbine being connected to drive said first sun gear and said secondary turbine being connected to drive said second sun gear, said second ring gear being rigidly connected to said first planetary gear carrier only; a one-way clutch for locking together said first planet gear carrier and said second sun gear; and a brake being effective to lock said first ring gear so that said ring gear serves as a reaction element for said first planetary gear set and thereby establishes a power drive from said primary turbine through both of said gear sets to said driven shaft, said secondary turbine being effective to disengage said one-way clutch and to provide an increasing drive of said second planetary gear set as the speed of said driven shaft increases, thereby increasing the driving gear ratio between said drive shaft and said driven shaft.

5. In a transmission, the combination of a drive shaft; an intermediate sleeve shaft; an intermediate shaft; a hydrodynamic coupling device having a driving member or impeller and primary and secondary driven elements or turbines, said impeller being connected with said drive shaft, said primary turbine being connected with said sleeve shaft and said secondary turbine being connected with said intermediate shaft; first and second planetary gear sets each having a sun gear, planet gears and a planet gear carrier, said sun gear of said first gear set being connected with said sleeve shaft to be driven thereby, said sun gear of said second planetary gear set being connected with said intermediate shaft to be driven thereby, said planetary gear carrier of said second gear set being connected to said driven shaft, said ring gear of said second gear set being connected to said carrier of said first gear set and being connected to said intermediate shaft by a one-way clutch; and an engaging device for connecting an element of said first gear set with said drive shaft for thereby establishing a high speed three path power drive between said drive shaft and said driven shaft with one path being exclusive of said hydrodynamic device and the other paths being through said hydrodynamic device.

6. In a transmission, the combination of a drive shaft; an intermediate sleeve shaft; an intermediate shaft; a driven shaft; a hydrodynamic coupling device having a driving member or impeller connected to said drive shaft and primary and secondary driven elements or turbines, said primary turbine being connected with said sleeve shaft and said second turbine being connected with said intermediate shaft; a first planetary gear set having a ring gear, a sun gear, a plurality of planet gears in mesh with said ring and sun gears, and a planet gear carrier, said sun gear being connected with said sleeve shaft to be driven thereby; a second planetary gear set having a ring gear, a sun gear, a plurality of planet gears in mesh with said ring and sun gears, and a planet gear carrier connected to said driven shaft, said second sun gear being connected to said intermediate shaft to be driven thereby and said second ring gear being rigidly connected to said first planet gear carrier and being connected to said intermediate shaft by a one-way clutch; and a clutch for connecting said first ring gear with said drive shaft for thereby establishing a three path power train between said drive and driven shafts, with one path being exclusive of such hydrodynamic device and the other two paths being through said hydrodynamic device, said paths recombining in said second planetary gear set for driving said driven shaft.

7. In a transmission, the combination of a drive shaft; a driven shaft; a hydrodynamic coupling device having a driving member or impeller driven by said drive shaft and having primary and secondary drive elements or turbines; first, second, and third planetary gear sets each having a sun gear, planetary gears, ring gear and planetary gear carrier, said primary turbine being connected with said sun gear of said first gear set and said secondary turbine being connected with said sun gear of said second gear set, a planet gear carrier of said second gear set being connected to said driven shaft, said ring gear of said second gear set being connected to said carrier of said first gear set; a one-way engaging device for locking said sun gear of said second gear set with said planetary gear carrier of said first set, said planetary gear carrier of said third gear set also being connected to said driven shaft, said sun gear of said third gear set being rigidly connected with said ring gear of said first gear set; and a brake for said ring gear of said third gear set for taking reaction from said gear set and thereby establishing a reverse drive power train through said hydrodynamic device and said planetary gear sets between said drive shaft and said driven shaft.

8. In a transmission, the combination of a drive shaft; a driven shaft; a hydrodynamic coupling device having a driving member driven from said drive shaft and primary and secondary driven elements or turbines; first, second, and third planetary gear sets each having a ring gear, a sun gear, a plurality of planet gears in mesh with said ring gear and sun gears, and a planet gear carrier, said primary turbine being connected with said sun gear of said first gear set and said secondary turbine being connected with said sun gear of said second gear set, said ring gear of said second gear set being connected to said carrier of said first gear set; a one-way clutch for connecting together said second sun gear with said first planet gear carrier, said second planet gear carrier being connected with said driven shaft, said third planet gear carrier also being connected with said driven shaft, said third sun gear being rigidly connected with said first ring gear; and a positive type brake for said third ring gear for taking reaction from said third planetary gear set and thereby establishing a reverse drive power train from said drive shaft through said hydrodynamic device and said planetary gear set, to said driven shaft, said second planetary gear set functioning as a rotating reaction element as reverse driving torque is transmitted through said first and third planetary gear sets to said driven shaft, and the reverse driving speed ratio increasing with speed of said driven shaft.

References Cited in the file of this patent

UNITED STATES PATENTS

| | | |
|---|---|---|
| 2,519,022 | Burtnett | Aug. 15, 1950 |
| 2,601,045 | Mayner | June 17, 1952 |
| 2,695,533 | Pollard | Nov. 30, 1954 |
| 2,775,910 | Wilkerson | Jan. 1, 1957 |
| 2,794,349 | Smirl | June 4, 1957 |